Feb. 27, 1923. 1,447,102.
J. RAE.
STEAM TRAP.
FILED JULY 13, 1921.
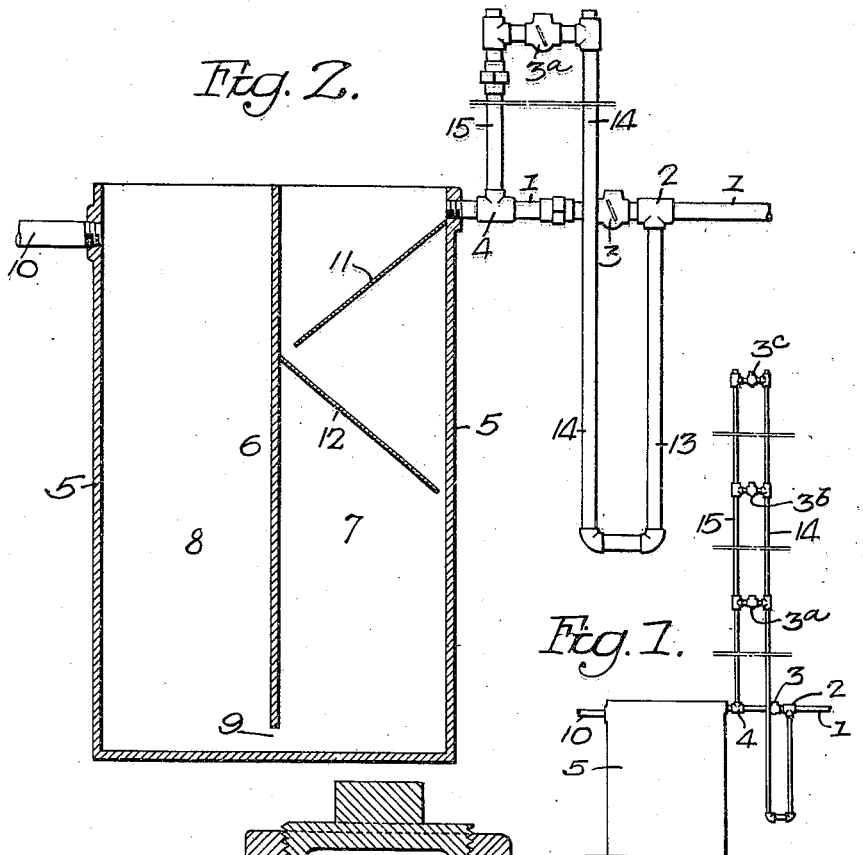
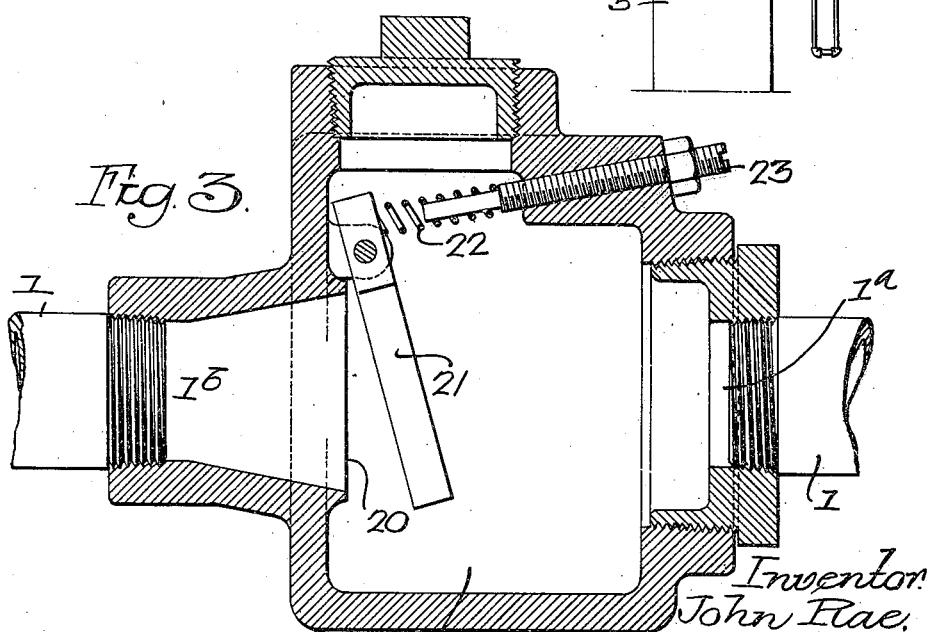
Inventor:
John Rae,
by his Attorneys
Howson & Howson Patented Feb. 27, 1923.

1,447,102

UNITED STATES PATENT OFFICE.

JOHN RAE, OF PHILADELPHIA, PENNSYLVANIA.

STEAM TRAP.

Application filed July 13, 1921. Serial No. 484,356.

*To all whom it may concern:*

Be it known that I, JOHN RAE, a citizen of the United States, residing in Philadelphia, Pennsylvania, have invented Steam Traps, of which the following is a specification.

One object of this invention is to provide a simple, inexpensive, durable device or combination of parts for automatically separating water from steam, and more particularly for permitting escape of water of condensation from a pipe line, while preventing the escape of steam under pressure.

I further desire to provide a device of the above character, which while effectually preventing the escape of steam, shall permit flow of water from a conduit or container at any of several pressures below a predetermined maximum,—the invention contemplating an easily installed combination which shall require a minimum of attention with practically no liability of getting out of order.

These objects and other advantageous ends I attain as hereinafter set forth, reference being had to the accompanying drawings, in which, Fig. 1 is a side elevation, to some extent diagrammatic, illustrating my invention;

Fig. 2 is a side elevation, partly in section and on a larger scale than Fig. 1, further illustrating the invention; and Fig. 3 is a full size vertical section through a check valve which may be used in connection with, or as part of the apparatus shown in Figs. 1 and 2.

In the above drawings, I represents a pipe leading from a steam line, steam using apparatus, steam exhaust line, or other structure containing or conveying steam from which it is desirable to separate condensed water or other liquid. The end of this pipe 1 is connected through a T fitting 2, a check valve 3 and a second T fitting 4, to a receptacle such as the tank 5, which in the present instance is designed to separate oil from the water discharged into it. This tank has a vertically extending partition 6 dividing it into two compartments 7 and 8, which are connected through an opening 9 in or under the bottom of said partition;—the pipe line 1 delivering into the upper part of the compartment 7 and a water delivery pipe 10 being connected to the upper part of the compartment 8, preferably at a level slightly below that of the pipe 1. Two oppositely inclined baffle plates 11 and 12 are mounted one above the other in the compartment 7 so as to successively receive the liquid discharged from the pipe 1. The T fitting 2 is connected to one arm 13 of a U-shaped conduit whose second and longer arm 14 extends above the level of the pipe 1 to any desired height and is connected at any desired number of different points to a vertical conduit 15, through one or more check valves $3^a$, $3^b$, $3^c$, etc. The lower end of this pipe 15 is connected to the delivery pipe 1 between the check valve 3 and the tank 5. Said check valve is of the normally open type and is designed to automatically close when fluid at more than a predetermined pressure endeavors to pass through it.

As typical of a valve which may be used for this purpose, I have shown in Fig. 3 a casing having a fluid inlet $1^a$ and a fluid outlet $1^b$ provided with annular seat 20 adjacent which is pivotally mounted a movable valve element in the form of a plate 21 normally acted on by a spring 22 so that it tends to remain in its open position away from its seat. For this purpose the upper end of said valve is extended so as to be operated on by the coil spring 22, which may be adjusted by means of a stem 23 threaded through the top of the valve casing and acting against it. This spindle or stem is so adjusted as to hold the valve element 21 open until any small pressure within the casing rises to such a point as to cause fluid to flow therethrough at a velocity sufficient to cause said element to move into engagement with its seat against the action of the spring 22, and it will remain seated until the pressure in the casing falls sufficiently to permit the spring to again open it. The valves $3^a$, $3^b$ and $3^c$, being similar in construction to the valve 3, like it are adjusted to close at a definite and predetermined pressure.

Under conditions of use if the drip pipe 1 be connected to an exhaust steam line for example, the condensed water from the latter will first flow into and fill the U pipe 13—14 up to the level of said pipe 1. Thereafter said water will pass through the check valve 3 and into the separating tank 5 as long as there is insufficient pressure to cause closing of the valve element 21,—in a given case as long as the pressure of the water remains below two pounds it flows quietly to the tank 5. When it rises above this point, the pressure acts on the valve element 21 to cause it to move into engagement with the seat 20. No further flow of water will thereafter occur until its pressure falls, when the valve will open and water will again flow until it is completely discharged, whereupon the steam in the pipe 1, flowing at a higher pressure and velocity than said water, at once closes said valve.

If while the water is flowing through the valve 3 the pressure in the pipe 1 be raised, the movable valve element 21 will be seated as above noted and the water in the U pipe 13—14 will be forced upwardly in the long arm of said pipe which is intended mainly to hold enough water to fill the vertical branch 14 for the maximum pressure desired. If the water in said branch is below a definite pressure, say two pounds to the square inch, it may flow through the open check valve 3ª through the pipe 15 and thence into the tank 5. Again, however, if its pressure exceeds two pounds to the square inch, the second check valve will close and will open only after the pressure has fallen to two pounds. If the pressure continues to fall to substantially zero pressure, the valve 3 will open and permit the escape into the tank 5 of the water in the branch 14 above the level of the pipe 1.

The two lines 14 and 15 may be extended upwardly to any desired height and connected at two or more points by other check valves arranged in parallel with valve 3ª, as indicated at any of a number of different pressures, but will in no case allow escape of steam, since the smallest pressure of the latter is sufficient to close any one of the valves 3—3ᶜ, if admitted into the valve casing.

The device thus has a free outlet to drain an exhaust steam line and at the same time is capable of likewise draining the water from this line even though the steam pressure rose to any of a number of different higher points, as might be the case when one or several steam using devices were delivering exhaust steam into it independently of a back pressure valve which would be set to take care of a maximum pressure in the exhaust line.

From the above description it will be appreciated that the device is of relatively simple and inexpensive construction and may not only be quickly and conveniently installed, but will at all times be ready for operation even though it has been out of service for some time. Obviously any oil mixed with the water delivered to the tank 5 will remain on the surface of that portion of said water within the compartment 7, since nothing but water will pass through the opening 9 into the compartment 8, and this oil may be withdrawn from the compartment 7 when necessary or desirable. Moreover by the multiple or parallel connection of the check valves above described, liquid at any of several pressures may be delivered from a steam pipe or container without permitting escape of any steam.

I claim:

1. The combination in a steam trap system of a plurality of normally open check valves connected in parallel to a common source of the fluid under pressure and operative to close at different pressures.

2. The combination in a steam trap system of a pipe to be drained; a plurality of normally open check valves connected to said pipe in parallel relation to each other and at different levels relatively to the pipe to permit escape of water therefrom at any of several pressures.

3. The combination in a steam trap system of a plurality of normally open check valves connected in parallel relation; with means for causing said valves to close successively as the pressure of fluid delivered to them is increased.

4. The combination of a fluid conveying conduit having a U-shaped branch; with normally open check valves connected respectively to said conduit and to said U-shaped branch.

5. The combination of a fluid delivery pipe; a normally open check valve therein; a U-shaped branch having arms of unequal length and having its shorter arm connected to and extending downwardly from said conduit; with a second check valve connected to the upper part of the longer arm of said branch and also connected to the conduit beyond the first check valve.

6. The combination of a steam drip pipe; a riser connected thereto; a normally open check valve connected to said pipe beyond the riser; and a plurality of other check valves connected at different levels between the riser and the drip pipe beyond the first check valve.

JOHN RAE.